(12) United States Patent
Lueschow

(10) Patent No.: US 7,418,331 B2
(45) Date of Patent: Aug. 26, 2008

(54) METHOD FOR INDICATING A FAULTY STRUT AND VEHICLE USING SAME

(75) Inventor: Kevin J. Lueschow, Elmwood, IL (US)

(73) Assignee: Caterpillar Inc., Peoria, IL (US)

(*) Notice: Subject to any disclaimer, the term of this patent is extended or adjusted under 35 U.S.C. 154(b) by 765 days.

(21) Appl. No.: 10/868,074

(22) Filed: Jun. 15, 2004

(65) Prior Publication Data

US 2005/0278089 A1    Dec. 15, 2005

(51) Int. Cl.
*G06F 11/00* (2006.01)
(52) U.S. Cl. .............................. 701/50; 701/36; 701/37; 180/41; 280/5.5; 280/5.501
(58) Field of Classification Search .................. 701/29; 340/438
See application file for complete search history.

(56) References Cited

U.S. PATENT DOCUMENTS

| 4,744,239 A | | 5/1988 | Kyrtsos et al. | |
| 4,845,975 A | | 7/1989 | Kyrtsos et al. | |
| 4,887,454 A | * | 12/1989 | Kyrtsos et al. | 73/11.07 |
| 4,984,467 A | * | 1/1991 | Haefner | 73/721 |
| 6,434,474 B1 | * | 8/2002 | Kotwicki et al. | 701/108 |
| 6,659,095 B2 | * | 12/2003 | Kotwicki et al. | 123/690 |
| 2003/0014417 A1 | * | 1/2003 | Kelkar | 707/100 |
| 2003/0149517 A1 | * | 8/2003 | Murphy et al. | 701/45 |

* cited by examiner

*Primary Examiner*—Khoi H. Tran
*Assistant Examiner*—Johnathan Goldfarb
(74) *Attorney, Agent, or Firm*—Liell & McNeil

(57) ABSTRACT

Operating a vehicle with a faulty strut can cause serious consequences. The present disclosure includes a method of detecting a fault within a strut during operation of a vehicle. Pressure within the strut is sensed, and a magnitude of asymmetry within a plurality of the sensed pressures is determined. A faulty strut (e.g. overcharged or collapsed) is indicated when the magnitude of asymmetry is outside of a predetermined range of asymmetry.

20 Claims, 3 Drawing Sheets

METHOD FOR INDICATING A FAULTY STRUT AND VEHICLE USING SAME

TECHNICAL FIELD

The present disclosure relates generally to struts for vehicles, and more specifically to a method for indicating a fault for a strut within a vehicle suspension system.

BACKGROUND

Most vehicles, such as off-highway trucks, include suspension systems with a plurality of gas-over-liquid struts that operate to dampen the oscillatory motion caused by the vehicle's engagement with the ground. For instance, many off-highway dump trucks, include a suspension system with four struts positioned to support the payload of the truck. In off-highway trucks, the struts not only help smooth the ride, the struts also can aid in estimating a payload carried by the truck based on a known relationship between strut pressure and payload. The estimated payload can be used to estimate truck productivity, which in return, can help a business better plan for the future.

However, struts are not always in good working condition, and are subject to faults, such as being undercharged, often referred to as collapsed, or being overcharged. Operation of the vehicle with a faulty strut can cause uneven tire wear that can lead to unscheduled maintenance or tire failure. Moreover, a completely collapsed strut can lead to extensive structural damage due to repeated metal-to-metal contact. In addition, a faulty strut can adversely affect the accuracy of a payload weight estimation, which can lead to detrimental business decisions.

Over the years, there have been methods developed for detecting a faulty strut. For instance, a faulty strut can be detected through operator inspection. However, operator inspection is subject to human error and often cannot detect a fault that occurs during operation until after the operation has ended. There have been methods developed for indicating a faulty strut during operation of the truck. These methods generally compare the relative motion of at least two struts on the truck for a predetermined period of time, and thus, operate under the assumption that the load of the truck is equally distributed. For instance, a method for detecting a collapsed strut in a moving truck, set forth in U.S. Pat. No. 4,887,454, issued to Kyrtsos et al., on Dec. 19, 1989, requires a step of comparing strut pressure among the plurality of the truck's struts. Thus, the Kyrtsos method of detecting a collapsed strut requires a vehicle with more than one strut, and can be relatively complicated and time consuming.

The present disclosure is directed at overcoming one or more of the problems set forth above.

SUMMARY OF THE DISCLOSURE

In one aspect of the present disclosure, a vehicle includes a vehicle chassis to which a suspension system including at least one strut is attached. At least one pressure sensor is operable to sense a pressure within the strut. An electronic control module is in communication with the pressure sensor, and includes a fault detection algorithm that is operable to detect an asymmetry in a plurality of sensed pressures from the pressure sensor.

In another aspect of the present disclosure, an article includes a computer readable data storage medium on which a fault detection algorithm is stored. The fault detection algorithm is operable to detect a fault for a strut, at least in part, by detecting an asymmetry in a plurality of sensed pressures within the strut.

In yet another aspect of the present disclosure, there is a method of detecting a fault within a strut. After a pressure within the strut is sensed, a magnitude of asymmetry within a plurality of the sensed pressures is detected. A fault for the strut is indicated when the magnitude of asymmetry is outside of a predetermined range of asymmetry.

DETAILED DESCRIPTION

Figure 1:
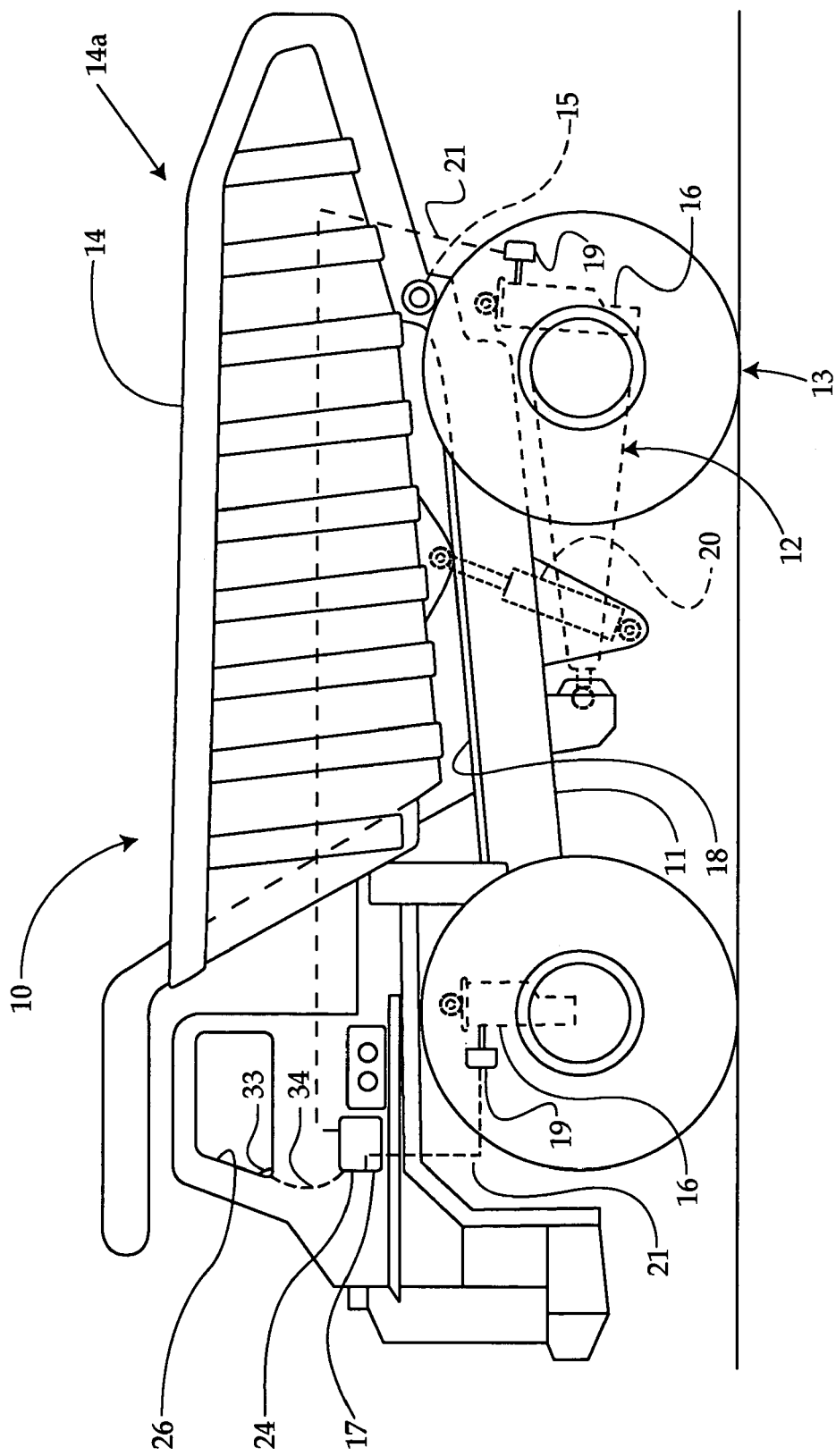
FIG. 1 is a side schematic illustration of a vehicle, according to the present disclosure.

Referring to FIG. 1, there is a side schematic illustration of a vehicle 10, according to the present disclosure. The vehicle 10 is preferably a truck, but can be any type of vehicle, for use on or off highway, that includes a suspension system that includes at least one strut. In the illustrated embodiment, the vehicle 10 is an off-highway dump truck. The dump truck 10 includes a chassis 11 to which a dump body 14 is moveably attached via pivot pins 15 and a hydraulic cylinder 20. When the dump body 14 is in a travel position 14a (as shown in FIG. 1), there is negligible pressure within the hydraulic cylinder 20, and the weight of the dump body 14 is supported by the chassis 11 and a pair of payload rail support pads 18 attached to the chassis 11. When the dump body 14 is in the dump position 14b (not shown), the hydraulic cylinder 20 is pressurized in order to raise the dump body 14 about the pivot pins 15 and dump the contents within the dump body 14.

A suspension system 12 is also attached to the chassis 11 in order to dampen the oscillatory motion between a ground engaging portion 13 and the dump body 14. Although the present disclosure contemplates a suspension system including any number of struts, including only one, the illustrated dump truck 10 includes four struts 16, being a rear left strut, a rear right strut (not shown), a front left strut, and a front right strut (not shown). The struts 16 are disposed in a supporting relation to the dump body 14 of the dump truck 10 in a conventional manner, and are of a gas-over-liquid type commonly known in the art. A pressure sensor 19 is positioned within each strut 16, and each sensor 19 is operable to sense the pressure within the respective strut 16. It should be appreciated that the pressure of the fluid within the struts 16 is related to a payload weight within the dump body 14. Further, the pressure within the struts 16 is normally subjected to oscillations while the dump truck 10 is traveling. Although these oscillations will vary in frequency and magnitude, they should remain relatively symmetrical about a mean pressure.

The pressure sensors 19 are in communication with an electronic control module 24 via sensor communication lines 21. The electronic control module 24 includes an article 17 that includes a computer readable data storage medium on which a fault detection algorithm 22 is recorded. The fault detection algorithm 22 is operable to detect a fault in the struts 16 by detecting an asymmetry in a plurality of sensed pressures from each strut's respective pressure sensor 19. The electronic control module 24 is also in communication with a strut fault indicator 33 via an indicator communication line 34. The strut fault indicator 33 can be a visible indicator, such as a light, or an audible indicator. The strut fault indicator 33 is preferably attached to the chassis 11 in a position within an operator's station 26 at which the operator can view or hear. The indicator 33 might also include a transmitter for transmitting fault data to a remote location.

Figure 2:
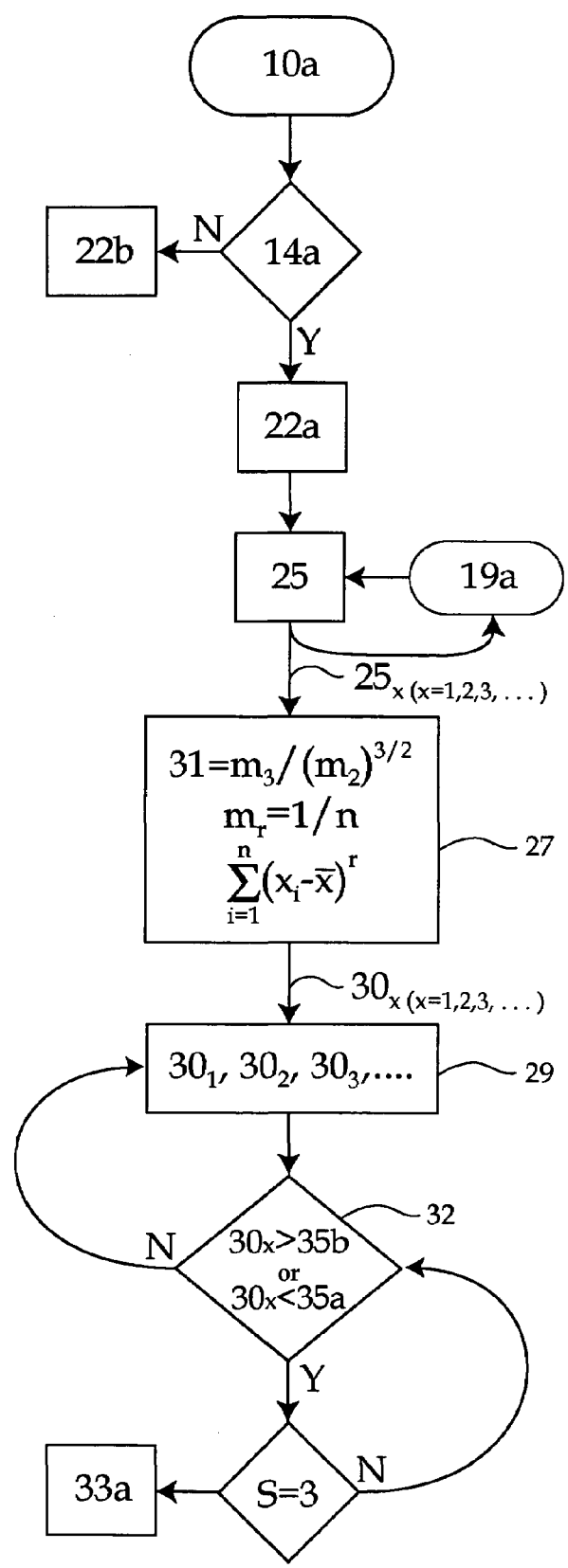
FIG. 2 is a flow chart of a fault detection algorithm, according to the present disclosure.

Referring to FIG. 2, there is shown a flow chart of the fault detection algorithm 22, according to the present disclosure. After truck start-up 10a, the fault detection algorithm 22 is activated when the electronic control module 24 determines that the dump body 14 is in the travel position 14a. The fault detection algorithm 22 includes a re-writeable data set 25 that includes a plurality of stored sensed pressures, and a storage algorithm 28 operable to re-write the data set 25 at a predetermined time interval. Although the predetermined time interval can vary, for the illustrated dump truck 10, the predetermined time interval is preferably on the order of about fifteen minutes. The longer the predetermined time interval, the more sensed pressure measurements are being stored, the more likely that an asymmetry within the plurality of sensed pressure caused by disturbances in the road can be detected to reveal a fault within one of the struts 16. However, it is desirable to detect a faulty strut as quickly as possible in order to limit the consequences of operating with the faulty strut. In the illustrated embodiment, the sensed pressure 19a is stored at some predetermined frequency, such as four times per second. Thus, fifteen minutes provides time to store a sufficient number of sensed pressures 19a in order to accurately determine asymmetry via known statistical processing techniques. However, those skilled in the art will appreciate that the predetermined time interval for the dump truck 10 could be as short as two minutes, in which four hundred and eighty sensed pressures 19a would be stored. After the predetermined time interval, the storage algorithm 28 will re-write the data set 25 with a new plurality of sensed pressures for a subsequent time interval. Thus, every fifteen minutes, a new data set 25x (x being a variable to distinguish between data sets) of sensed pressures is created.

The fault detection algorithm 22 includes a skew determining algorithm 27 that is operable to calculate skew 30x of the plurality of sensed pressures. Thus, in the preferred embodiment, the skew determining algorithm 27 will calculate skew 30x of the data set 25x including the plurality of sensed pressures every fifteen minutes. However, it should be appreciated that the present disclosure contemplates triggers other than the predetermined time interval for initiating a skew calculation. Those skilled in the art will appreciate that skew is the third standardized moment about a mean, and is a measure of asymmetry in a distribution of data points about the mean. There are various methods of calculating skew, including, but not limited to, calculating Pearson's second coefficient of skewness. In order to calculate Pearson's second coefficient of skewness, the following formula is used: $3(m-M_d)/s$, with s being standard deviation, m being the mean, and Md being the median. Although the present disclosure contemplates determining skew by calculating Pearson's second coefficient of skewness, the skew determining algorithm 27 preferably includes a coefficient of skewness 31. Thus, the skew determining algorithm 27 is operable to determine the skew 30x of the plurality of sensed pressures by calculating the coefficient of skewness 31 of the plurality. The coefficient of skewness 31 can be calculated using the following formulas: $m_3/(m_2)^{3/2}$ and $m_r = 1/n \Sigma (x_i - m)^r$, with $m_3$ being the third moment about the mean, $m_2$ being the second moment about the mean, m being the mean, and r being 3 for the third moment and 2 for the second moment. Calculating the coefficient of skewness 31 is more complicated, but more accurate, than calculating Pearson's second coefficient of skewness. Those skilled in the art will appreciate that the skew determining algorithm 27 could employ any known strategy or technique for detecting a substantial asymmetry in the data.

The fault determining algorithm 22 preferably includes a skew monitoring algorithm 29 that is operable to store a calculated skew 30x for a plurality of data sets 25x. The fault determining algorithm 22 also preferably includes a fault indicating algorithm 32 that is operable to indicate when the calculated skew 30x for a predetermined number of consecutive data sets 25x is outside of a predetermined range of skew 35. Because skew may have causes other than a faulty strut, requiring more than one consecutive data set 25x for which the calculated skew 30x is outside of the predetermined range 35 is preferred to improve robustness and avoid false positive indications. The more consecutive data sets for which the skew 30x is outside of the predetermined range 35, the more likely the skew is being caused by a fault within the strut 16. However, utilizing a smaller predetermined number of consecutive skewed data sets will decrease the time required to detect a possible fault in the strut 16. In the illustrated example, the predetermined number is three, but could be as low as one. Thus, when a number(s) of the consecutive calculated skews 30x outside of the predetermined range of skew 35 equals three, the fault indicating algorithm 32 will indicate a fault.

The predetermined range of skew 35 can also vary. Those skilled in the art will appreciated that skew coefficient values can range from −2 to 2, with zero being no skew. In the illustrated embodiment, the predetermined range of skew 35 includes a negative end 35a of −0.5 and a positive end 35b of 0.5. Thus, if the calculated skew 30x for three consecutive data sets 25x are greater than 0.5 or less than −0.5, the fault indicating algorithm 32 will indicate such. The fault indicating algorithm 32 is operable to activate the strut fault indicator 33. The activated strut fault indicator 33a will indicate to the operator of a fault within one of the struts 16 and prompt the operator to seek maintenance on the identified strut. If, during the fault determining algorithm 22, the electronic control module 24 senses that the dump body 14 is in the dump position 14b, the fault determining algorithm 22 will deactivate 22b.

Figure 3:
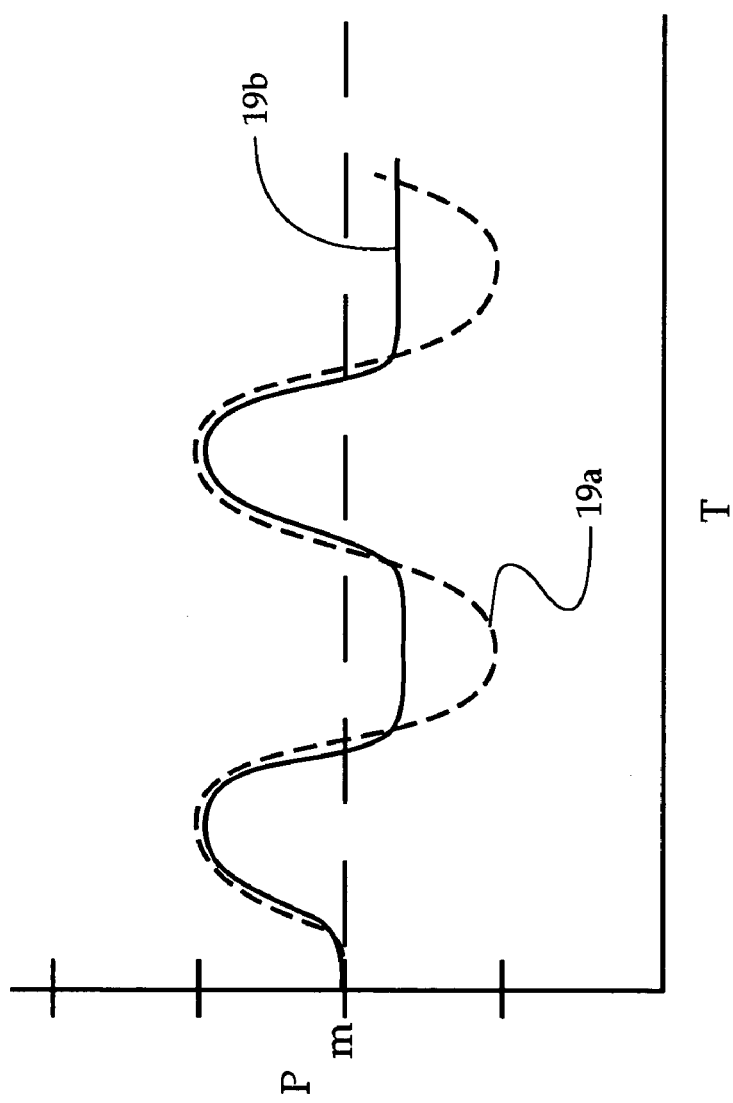
FIG. 3 is a graph illustrating pressure within a non-faulty strut and a faulty strut over time, according to the present disclosure.

Referring to FIG. 3, there is shown a graph illustrating a pressure signals for a non-faulty strut 19b and a faulty strut over time 19c, according to the present disclosure. Time (T) is illustrated along the X-axis and the pressure (P) is illustrated along the Y-axis. The pressure signal for the non-faulty strut 19b consists of sinusoidal waves that can be associated with various resonant frequencies of the truck 10 in motion. Because the mean (m) of the pressure signal for the non-faulty strut 19b is approximately equal to the median of the pressure signal for the non-faulty strut 19b, the calculated skew 30x will be approximately zero. However, the pressure signal for the faulty strut 19c includes clamped sinusoidal waves, meaning the pressure data is not evenly distributed about the mean (m). Thus, the pressure signal for the faulty strut 19c will have a positive calculated skew 30x indicating thaw the strut is undercharged or collapsed. Those skilled in the art will appreciate that, during the operation of the truck 10, the pressure signal 19b or 19c would be embedded within other pressure signals with various frequencies. Thus, it might be desirable to filter the data before calculating skew, such as to remove high frequency noise.

INDUSTRIAL APPLICABILITY

Referring to FIGS. 1-3, a method of determining a fault within the struts 16 will be described for application within the off-road dump truck 10. However, those skilled in the art should appreciate that the method could be applied to any type of vehicle that includes a suspension system with at least one strut. Although the method will be described for one strut within the suspension system 12 of the truck 10, it should be appreciated that the present disclosure operates similarly for each of the four struts 16. In fact, the present disclosure contemplates the fault determining algorithm 22 operating simultaneously for each of the four struts 16.

In order to detect a fault within the strut 16, after truck start-up 10a, the electronic control module 24 will activate the fault determining algorithm 22 if the electronic control module 24 determines that the dump body 14 is in the travel position 14a. The pressure sensor 19 will sense the pressure within the strut 16 approximately four times/second, and communicate the sensed pressure 19a to the electronic control module 24. The storage algorithm 28 of the fault determining algorithm 22 will store the sensed pressures 19a within the re-writeable data set 25. Every predetermined time interval, preferably fifteen minutes, the storage algorithm 28 will include a data set 25x based on the plurality of sensed pressures that is then subjected to the skew determining algorithm 27. The storage algorithm 28 will begin to create a new data set 25x (x=2) by re-writing over the previous data set 25x (x=1) with newly sensed pressures 19a.

After sensing and storing the pressure within the strut 16, the fault determining algorithm 22 can detect a magnitude of asymmetry within the plurality of sensed pressures. However, the present disclosure contemplates the magnitude of asymmetry being detected in an ongoing fashion without storing the plurality of sensed pressures. In order to do so, the electronic control module 24 must have the capability to calculate and update the skew of the sensed pressure each instance that sensed pressure is communicated to the electronic control module. In the illustrated embodiment, the skew determining algorithm 27 within the fault determining algorithm 22 will calculate the skew of the data set 25x (x=1) based on the plurality of the stored, sensed pressures. Although the present disclosure contemplates calculating skew 30 by calculating Pearson's coefficient of skewness, preferably skew is calculated by calculating the coefficient of skewness 31 for the data set 25x (x=1). The coefficient of skewness 31 of the data set 25x is a more accurate reflection of the skew than Pearson's coefficient of skewness. Other asymmetry detection calculations could also be utilized. In order to calculate the coefficient of skewness 31 of the data set 25x (x=1), the skew determining algorithm 27 will use the following formulas: $31 = m_3/(m_2)^{3/2}$ and $m_r = 1/n \Sigma (x_t - m)^r$, with $m_3$ being the third moment about the mean, $m_2$ being the second moment about the mean, m being the mean, and r being 3 for the third moment and 2 for the second moment. The skew monitoring algorithm 29 of the fault determining algorithm 22 will store the calculated skew 30x (x=1) for the data set 25x (x=1). Further, as the storage algorithm 28 creates additional data sets 25x (x=2,3 . . . ), and the skew determining algorithm 27 calculates the skew 30x (x=2,3 . . . ), for each of the data sets, the skew monitoring algorithm 29 will preferably store the calculated skews 30x (x=2,3 . . . ).

After detecting a magnitude of asymmetry within the plurality of sensed pressures by calculating skew 30x for a plurality of data sets 25x, a fault for the strut 16 will be indicated when the magnitude of asymmetry is outside of the predetermined range of asymmetry 35. In order to determine whether the magnitude of asymmetry is outside of the predetermined range 35, the fault indicating algorithm 32 of the fault determining algorithm 22 indicates when the calculated skew 30x for the predetermined number of consecutive sets, being three, is outside of the predetermined range of skew 35. Although the predetermined range of skew 35 may vary, in the illustrated example, the predetermined range of skew has the negative end 35a of −0.5 and the positive end 35b of 0.5. Thus, if the calculated skew 30x for three consecutive data sets 25x are greater than 0.5 or less than −0.5, the fault indicating algorithm 32 will indicate a fault for the strut 16. The fault indicating algorithm 32 can indicate which strut 16 includes the fault based on which pressure was being monitored, and whether the strut 16 is overcharged or undercharged. If the strut 16 is undercharged, the calculated skew 30x will be positive, and may resemble the pressure signal for the faulty strut 19c in FIG. 3. If the strut 16 is overcharged, the calculated skew 30x will be negative. Therefore, the fault indicating algorithm 32 can activate the fault indicator 33 via the indicator communication line 34. The activated indicator 33a can alert the operator of the fault within the strut 16 and whether the strut 16 is overcharged or undercharged. This can also indicate when a strut is so undercharged as to be considered collapsed.

The present disclosure is advantageous because it provides an accurate method of identifying a faulty strut within a relatively short time period, thereby limiting the inconvenience and damage that can be caused by the fault. Specifically, the algorithm 22 of the present disclosure can identify a faulty strut without having to compare the performance of the strut 16 with the performance of the other struts 16 within the suspension system 12. Because the method does not compare strut performance, the method does not need to assume that the load of the truck 10 is equally distributed on all struts 16. Nor does the method of the present disclosure require a relatively large amount of data. Therefore, the fault determining algorithm 22 can indicate a fault within the struts 16 much faster than algorithms and/or methods with a strut performance comparison step. For instance, in the illustrated example in which the indicating algorithm 32 requires three consecutively skewed data sets in order to assure that the asymmetry is caused by a fault rather than roading conditions, a fault can still be identified in forty-five minutes. However, the fault determining algorithm 22 could detect asymmetry as quickly as two minutes or less. Moreover, the method of the present disclosure can provide an accurate detection of a faulty strut on a work machine that has only two struts, such as a Kress Coal Hauler.

Further, the present disclosure is advantageous because strut pressure is already being sensed within many trucks as a means of determining payload weight. Thus, the present disclosure does not require any new hardware to implement in many work machine applications.

It should be understood that the above description is intended for illustrative purposes only, and is not intended to limit the scope of the present disclosure in any way. Thus, those skilled in the art will appreciate that other aspects, objects, and advantages of the disclosure can be obtained from a study of the drawings, the disclosure and the appended claims.

What is claimed is:

1. A vehicle comprising:
   a chassis;
   a suspension system attached to the chassis and including at least one strut;
   at least one pressure sensor operable to sense a pressure within the strut; and an electronic control module in communication with the at least one pressure sensor, and including a fault detection algorithm being operable to detect an asymmetry in a plurality of sensed pressures from the pressure sensor.

2. The vehicle of claim 1 wherein the vehicle being a truck; and the suspension system includes at least four struts supporting a payload.

3. The vehicle of claim 1 wherein the fault detection algorithm includes a re-writeable data set including a plurality of stored sensed pressures, and a storage algorithm being operable to re-write the data set at a predetermined time interval.

4. The vehicle of claim 3 wherein the predetermined interval being about fifteen minutes.

5. The vehicle of claim 1 wherein the fault detection algorithm includes a skew determining algorithm.

6. The vehicle of claim 5 wherein the skew determining algorithm includes a coefficient of skewness.

7. The vehicle of claim 5 wherein the fault determining algorithm includes a skew monitoring algorithm being operable to store a calculated skew for a plurality of data sets.

8. The vehicle of claim 7 wherein the fault determining algorithm includes a fault indicating algorithm being operable to indicate when the calculated skew for at least one consecutive data set being outside of a predetermined range of skew.

9. The vehicle of claim 8 wherein the vehicle being a truck; the suspension system includes at least four struts supporting a payload;

the fault detection algorithm includes a re-writeable data set including a plurality of stored sensed pressures, and a storage algorithm being operable to re-write the data set at a predetermined time interval; and the skew determining algorithm includes a coefficient of skewness.

10. An article comprising:
a computer readable data storage medium; and
a fault detection algorithm being stored on the storage medium and being operable to detect a fault for a strut, at least in part, by detecting an asymmetry in a plurality of sensed pressures within the strut.

11. The article of claim 10 wherein the fault detection algorithm includes a skew determining algorithm.

12. The article of claim 11 wherein the skew determining algorithm includes a coefficient of skewness.

13. The article of claim 12 wherein the fault determining algorithm includes a skew monitoring algorithm being operable to store a calculated skew for a plurality of data sets.

14. The article of claim 13 wherein the fault determining algorithm includes a fault indicating algorithm being operable to indicate when the calculated skew for at least one consecutive data set being outside of a predetermined range of skew.

15. A method of detecting a fault within a strut, comprising:
sensing pressure within a strut;
detecting a magnitude of asymmetry within a plurality of the sensed pressures; and
indicating a fault for the strut when the magnitude of asymmetry is outside of a predetermined range of asymmetry.

16. The method of claim 15 wherein the step of detecting a magnitude of asymmetry includes a step of calculating skew.

17. The method of claim 16 wherein the step of calculating skew includes a step of calculating the coefficient of skewness.

18. The method of claim 15 wherein the step of detecting includes a step of re-writing a data set of the plurality of sensed pressures at a predetermined time interval.

19. The method of claim 18 wherein the predetermined time interval being fifteen minutes.

20. The method of claim 19 wherein the step of detecting the magnitude of asymmetry includes a step of calculating skew for a plurality of data sets, at least in part, by calculating a coefficient of skewness for the plurality of data sets; and the step of indicating includes a step of determining when the calculated skew for a predetermined consecutive number of data sets being outside of a predetermined range of skew.

* * * * *